(12) United States Patent
Beecher et al.

(10) Patent No.: US 8,148,120 B2
(45) Date of Patent: Apr. 3, 2012

(54) CONCENTRATION AND SEPARATION OF LIPIDS FROM RENEWABLE RESOURCES

(75) Inventors: Lance Beecher, Clemson, SC (US); David E. Brune, Seneca, SC (US)

(73) Assignee: Clemson University Research Foundation, Clemson, SC (US)

( * ) Notice: Subject to any disclaimer, the term of this patent is extended or adjusted under 35 U.S.C. 154(b) by 909 days.

(21) Appl. No.: 12/057,869

(22) Filed: Mar. 28, 2008

(65) Prior Publication Data

US 2009/0181436 A1   Jul. 16, 2009

Related U.S. Application Data

(60) Provisional application No. 60/908,441, filed on Mar. 28, 2007.

(51) Int. Cl.
C12P 7/64 (2006.01)
C12M 1/00 (2006.01)

(52) U.S. Cl. .................... 435/134; 435/289.1

(58) Field of Classification Search .............. 435/134, 435/289.1
See application file for complete search history.

(56) References Cited

U.S. PATENT DOCUMENTS

| | | | |
|---|---|---|---|
| 4,250,038 A | 2/1981 | Dryden | |
| 4,368,691 A | 1/1983 | Brune | |
| 4,695,411 A | 9/1987 | Stern et al. | |
| 5,338,471 A | 8/1994 | Lal | |
| 5,354,878 A | 10/1994 | Connemann et al. | |
| 5,539,133 A | 7/1996 | Kohn et al. | |
| 5,661,017 A | 8/1997 | Dunahay et al. | |
| 5,730,029 A | 3/1998 | Stoldt et al. | |
| 6,015,440 A | 1/2000 | Noureddini | |
| 6,065,245 A | 5/2000 | Seawright | |
| 6,174,501 B1 | 1/2001 | Noureddini | |
| 6,192,833 B1 | 2/2001 | Brune et al. | |
| 6,538,146 B2 | 3/2003 | Turck | |
| 6,827,841 B2 | 12/2004 | Kiser et al. | |
| 6,884,900 B2 | 4/2005 | Maeda et al. | |
| 6,960,672 B2 | 11/2005 | Nakayama et al. | |
| 6,986,323 B2 | 1/2006 | Ayers | |
| 7,135,308 B1 | 11/2006 | Bush et al. | |
| 7,258,790 B2 | 8/2007 | Brune et al. | |
| 2004/0074760 A1 | 4/2004 | Portnoff et al. | |
| 2006/0053515 A1 | 3/2006 | Geigenberger et al. | |
| 2006/0074256 A1 | 4/2006 | Alasti | |
| 2007/0048848 A1 | 3/2007 | Sears | |

OTHER PUBLICATIONS

Article—Gallagher et al., "Composition of San Fransico Bay Brine Shrimp", *Journal of Agricultural Food Chemistry*, Bol 23, No. 4, 1975; (pp. 630- ).
Abstract—Ginzburg, Ben-Zion Liquid fuel (oil) from halophilic algae: A renewable source of non-polluting energy, vol. 3, Issues 2-3, Mar.-Apr. 1993, pp. 249-252.
Article—Udo R. Kreutzer, "Manufacture of Fatty Alcohols Based on Natural Fats and Oils", *Journal of American Oil Chemists' Society*, vol. 61, No. 2 pp. 343-348, Feb. 1984.
Abstract—Dote, et al., "Recovery of liquid fuel from hydrocarbon-rich microalgae by thermochemical liquefaction", *Fuel*, 73:2, 1994.
Article—Sheehan, et al., "A Look Back at the U.S. Department of Energy's Aquatic Species Program: Biodiesen from Algae", National Renewable Energy Laboratory, Jul. 1998.
Article—Olivier Daniello, *An Algea Based Fuel*, Biofutur, No. 255, May 2005.
Brune et al., "The Application of Process Kinetics for Predicting Optimum Performance of Continuous Brine Shrimp Cultures", J. World Maricul. Soc. 15:108-119 (1984).

*Primary Examiner* — Herbert J Lilling
(74) *Attorney, Agent, or Firm* — Dority & Manning, P.A.

(57) ABSTRACT

Disclosed are methods that can advantageously utilize the natural consumptive and conversion processes of an aquatic organism culture system to concentrate and separate microbial plant-generated lipids. For instance, an aquatic organism culture can be maintained and/or grown upon an algal biomass. The natural conversion processes of the animals allows for uptake and processing of the components of the algal biomass into animal lipid. The aquatic animal culture can then be easily harvested such that a high percentage of the converted algal-generated lipid can be extracted using a low cost, simple and quick process. The disclosed processes provide an efficient oil production, conversion and recovery system that can be economically scaled up for use in, for example, integrated bioenergy and biodiesel production.

21 Claims, 7 Drawing Sheets

CONCENTRATION AND SEPARATION OF LIPIDS FROM RENEWABLE RESOURCES

CROSS REFERENCE TO RELATED APPLICATION

The present application claims filing benefit of U.S. Provisional Patent Application Ser. No. 60/908,441 having a filing date of Mar. 28, 2007, which is incorporated herein in its entirety.

BACKGROUND

Algae have been considered for many years as an excellent candidate as a renewable resource for natural oils. Algae have very high natural oil content, with some species having natural oil content greater than 50% of their total mass. In addition, algae can potentially produce 10 to 100 times more oil per cultivated acre than oil-producing land crops such as soybean, rapeseed, and palm. In addition, algae can be cultivated away from existing croplands on as yet uncultivated, unproductive, and desert lands. In addition, algae can be cultivated on potable or non-potable fresh water or on brackish or salt water. Thus, utilization of algae for production of oil in place of dry land crops may provide many benefits, not the least of which is potential avoidance of climate alteration form greenhouse gas production from fossil fuel usage.

The oils produced by algae can be utilized in a wide variety of applications. For instance, algae are the highest yield feedstock found to date for biodiesel production, lubricants, and the like. Biodiesel, a biodegradable, non-toxic fuel formed from transesterification of any of a variety of vegetable oils or animal fats, has long been considered a viable option to petroleum-based diesel (petrodiesel). Biodiesel can be utilized as formed in unmodified diesel engine vehicles and furnaces, can be easily blended with petrodiesel, and typically produces about 60% less net carbon dioxide emissions than petrodiesel. It is estimated that between 250 and 300 billion gallons of diesel oil is used annually in the United States for transportation fuels and home heating oil. Of this amount, only about 8% comes from renewable resources. Moreover, while relatively few automobiles in the U.S. utilize diesel fuel, the opposite trend exists in Europe, with total diesel consumption in the U.S. from trucks, buses and other transportation estimated to be about 80% of Europe's consumption level.

Between 1978 and 1996, the U.S. National Renewable Energy Laboratory (NREL) examined the possibility of using algae as a biodiesel source. These studies resulted in a collection of approximately 300 different species of algae, both fresh-water and salt-water, and made them available to researchers from around the world. This initial work on algal biodiesel development was curtailed in the mid-90's, due primarily to a drop in crude oil prices and government budget cuts. Interest in biodiesel from algal oils has revived due to both increasing crude oil prices and increasing interest in energy independence from fossil fuels.

While algae present an excellent oil source for a variety of applications including biodiesel production, problems must still be overcome in development of cost-effective, large scale algal production systems. For instance, many mass algal culturing operations require expensive species control techniques to maintain culture purity and the desired large oil recovery volumes. Moreover, harvesting, concentrating and drying microalgae biomass is difficult and costly. In addition, methods used to extract the oils from algae is one of the more costly aspects of the overall process and can in and of itself determine the viability of a production facility.

The most common algal harvest and oil extraction method utilizes mechanical and physical processing systems, usually combined with a solvent extraction process, for instance the well-known Soxhlet extraction process. Such processes are generally quite expensive in order to ensure suitable disruption of the algae cells and facilitate separation of the oils from other plant components. In addition, there are environmental and processing concerns associated with the solvents, usually hexane and benzene, as the process is usually carried out at high temperatures, leading to environmental issues due to solvent volatility.

Another algal extraction method contemplated is a supercritical fluid extraction process, but this method is also quite expensive, requiring pressure vessels and high energy input. Other methods have been considered including enzymatic extraction, osmotic shock extraction, and ultrasonic-assisted extraction, but these methods are expensive and not yet viable for a large scale production process.

What are needed in the art are environmentally friendly, low cost methods for obtaining oils produced from an algal feedstock.

SUMMARY

In one embodiment, disclosed is a method for recovering lipids from a renewable natural resource. More specifically, a method can include developing an invertebrate animal culture on an algal feedstock biomass. The algal feedstock biomass can include a single algae specie or a plurality of species, as desired. In addition, the algal feedstock biomass can include high oil content algae and/or low oil content algae. A method can also include harvesting the invertebrate animal culture following uptake and conversion of the plant lipids of the algal feed stock to animal lipid by the animal culture. Following harvest, the natural lipids of the animal culture can be extracted from the invertebrate animal culture.

In another embodiment, disclosed is a system for recovering lipids from a renewable natural resource. A system can include, for example, an algal feedstock development zone, an invertebrate animal culture area that is in fluid communication with the algal feedstock development zone, a grinder for grinding an invertebrate animal culture developed in the invertebrate animal culture area, and an oil extraction unit for extracting natural lipid from the ground invertebrate animal culture.

In yet another embodiment, disclosed is a brine shrimp culture, and in one particular embodiment, a high density brine shrimp culture at a density range equivalent to between about 1000 and about 10,000 adult animals per liter. More specifically, in order to maintain rapid growth rate and health of a brine shrimp culture the culture pH can be maintained between about 8 and about 10.

BRIEF DESCRIPTION OF THE DRAWINGS

A full and enabling disclosure, including the best mode thereof, to one of ordinary skill in the art, is set forth more particularly in the remainder of the specification, including reference to the accompanying Figures, in which.

DETAILED DESCRIPTION

Reference will now be made in detail to various embodiments of the presently disclosed subject matter, one or more examples of which are set forth below. Each embodiment is provided by way of explanation, not limitation, of the subject matter. In fact, it will be apparent to those skilled in the art that various modifications and variations may be made to the present disclosure without departing from the scope or spirit of the disclosure. For instance, features illustrated or described as part of one embodiment, may be used in another embodiment to yield a still further embodiment. Thus, it is intended that the present disclosure cover such modifications and variations as come within the scope of the appended claims and their equivalents.

The present disclosure is directed in one embodiment to methods for obtaining lipids from a renewable natural resource biomass. More specifically, methods of the present disclosure advantageously utilize the natural uptake and conversion process of an animal system to concentrate and separate useful natural lipid. According to disclosed processes, an invertebrate animal culture can be grown and developed upon an algal biomass. The natural algal uptake and conversion process of the animal culture can convert components of the algal biomass into animal lipid. The animal culture can then be harvested and the animal lipid naturally formed through uptake and conversion of the algal lipid biomass constituents can be extracted in a low cost, relatively simple process. The disclosed methods and systems can provide an efficient oil recovery process that can be economically scaled up for use in a variety of applications including, for example, biodiesel production.

Figure 1:
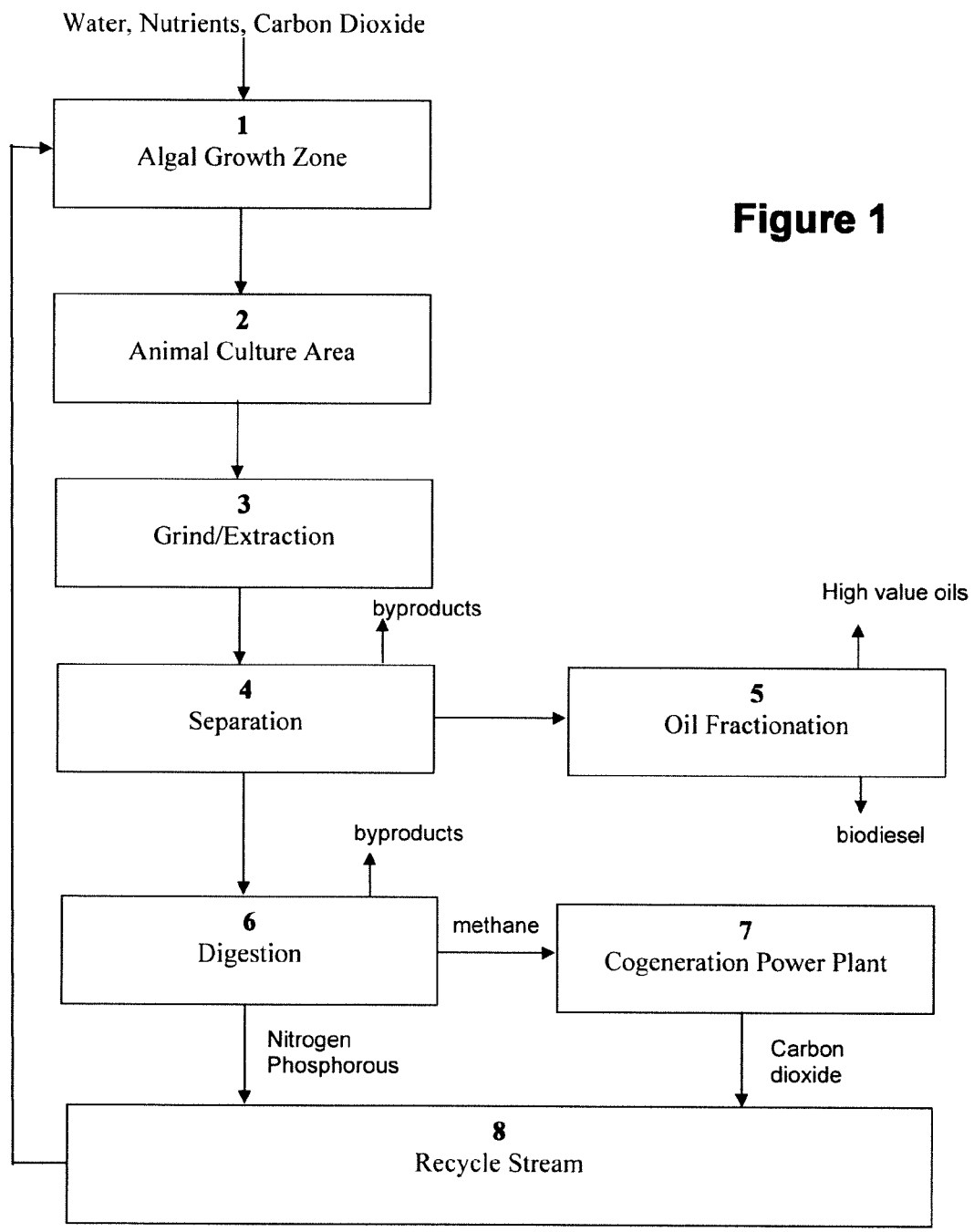
FIG. 1 is a flow diagram for one embodiment of an oil production process as described herein.

According to disclosed methods, an algal feedstock can be developed in conjunction with an invertebrate animal culture. FIG. 1 illustrates a flow diagram of one embodiment of a system as may beneficially utilize natural lipid uptake and conversion as described herein. It should be understood, however, that a system such as is illustrated in FIG. 1 is only one representative embodiment of disclosed methods, and the presently disclosed subject matter is not limited in any way to this illustrated representative embodiment. Specifically, any suitable culturing system can be utilized for developing an algal feedstock and uptake and conversion of the feedstock by an invertebrate animal culture that can then be harvested for the animal lipid thus formed. For example, in one embodiment, a partitioned aquaculture system such as that described in U.S. Pat. No. 7,258,790 to Brune, et al., which is incorporated by reference herein, can be utilized.

As can be seen with reference to FIG. 1, a system can include an algal growth zone 1 to develop the feedstock. The feedstock can include any algal biomass with preferred feedstock depending upon, for example, growth conditions, invertebrate animal culture, and so forth.

There are thousands of known species of algae, and possibly as many or more as yet unrecognized species, any of which may be utilized alone or in combination with other algae species as feedstock for an animal culture of disclosed processes. For instance, both fresh-water and salt-water algae is encompassed within the present disclosure. In one embodiment, the particular algae species utilized can be selected based upon the environmental conditions of the process. For example, the algae species or combination of species can be selected based upon the process conditions including season, light characteristics, temperature variations, water conditions (e.g., potable or non-potable water source, pH, salinity, nutrient availability, and the like) as well as based upon the natural oil content of the algae. Moreover, any particular algal biomass can be varied throughout the process, for instance due to seasonal variation and the like.

In one embodiment, the feedstock can be a high oil content algal feedstock, but this is not a requirement of disclosed methods. The term 'high oil content feedstock' as utilized herein generally refers to a feedstock including at least about 15 wt. % lipid, for instance between about 15 wt. % and about 40 wt. % lipid. For instance, in one embodiment, diatoms (genera *Amphora, Cymbella, Nitzschia*, and so on), also referred to as *Bacillariophytes*, may be utilized as a feedstock. Species of diatomes naturally exist in both salt water and fresh water and many species of diatoms are extremely rich in oil.

Genetically engineered algae can be utilized as feedstock. For instance, genetically engineered algae have been developed having increased expression of lipids through both direct and indirect means. Exemplary genetically engineered algae as may be utilized in a disclosed process can include those described by Dunahay, et al. (U.S. Pat. No. 5,661,017, incorporated herein by reference) that have been transformed to include a nucleic acid sequence encoding a dominant selectable marker operatively linked to an algal regulatory control sequence. The recombinant molecules described by Dunahay, et al. can also include a sequence encoding a product operatively linked to the control sequence. Thus, the transformed products can be genetically engineered to express higher than natural levels of a compound such as a lipid.

Another example of a genetically modified algal biomass as may be utilized as a feedstock is described by Geigenberger, et al. (U.S. Patent Application Publication No. 2006/0053515, incorporated herein by reference). According to the methods of Geigenberger, et al., genetically transformed materials can be developed to express leghemoglobin, which reversibly binds oxygen. Through expression of leghemoglobin, the genetically engineered materials can produce increased levels of storage reserves, including lipids. Such a genetically engineered feedstock is one in which increased lipid expression has been indirectly facilitated.

Beneficially, as an algal biomass can be used as feedstock in disclosed processes, rather than as the harvested product, purity of the algal biomass is not as critical as is the case in previously known processes in which the plant lipids are directly obtained from the algal biomass. For instance, single species algal biomass systems as are known in the art can require stringent control measures to ensure purity of the biomass. While such high-purity systems can be utilized as a feedstock in disclosed processes, this is not a requirement of the disclosed subject matter. Accordingly, disclosed cultures can be more economical to develop and maintain, as the invertebrate animal system that feeds on the algal biomass can not only effectively filter out impurities in the feedstock, but can also take up and convert all algae of the biomass, whether low-oil content or high-oil content, and form animal lipid that can be extracted according to a relatively simple oil-recovery process. Moreover, an invertebrate animal culture can take up and convert the algal lipid biomass constituents (lipids, carbohydrates, and/or proteins) to animal lipid with a consistent output in oils. For instance, in one embodiment, an invertebrate animal culture as described herein can produce a consistent weight percentage of animal lipid, no matter whether the feedstock is a high oil content feedstock, a low oil content feedstock, or a mixture thereof.

Referring again to FIG. 1, water, nutrients and other growth factors can enter an algal growth zone 1 according to any suitable process. Algal growth zone 1 can be indoor or outdoor, and can be of any suitable size and shape. For instance, algal growth zone 1 can be in the shape of a pond or channel constructed using earthen or concrete walls, or can be formed of open or closable tanks, as desired.

In one embodiment, the disclosed methods can be utilized in conjunction with other processes to provide additional ecological benefit. For instance, algae have been suggested as a $CO_2$ and/or $NO_x$ filter material for facilities such as cogeneration power plants. According to such an embodiment, flue gas from a facility such as a power plant can be utilized to add carbon dioxide to algal growth zone 1. The carbon dioxide can then be naturally converted to useful products including plant lipids through photosynthesis.

Similarly, the algal growth zone 1 can utilize by-products or waste streams from other processes. For instance, water fed to the growth zone 1 can include potable or non-potable water or can be fresh, salt, or brackish water. For example, agricultural, municipal, or other wastewater can provide water to an algal growth zone. By way of example, a stream derived from animal husbandry facilities or farmland can be provided to algal growth zone 1 to provide nutrients to the developing algae. According to this embodiment, potentially hazardous materials contained in wastewater can be prevented from release into groundwater sources. Moreover, some of those potentially environmentally damaging compounds, such as phosphates for example, can be beneficially utilized and naturally converted or degraded in the algal growth process.

In algal growth zone 1 water, e.g., saline groundwater, agricultural, municipal, and/or other wastewater, and so forth, and any added nutrients (nitrogen, phosphorous, carbon dioxide, etc.) can come into contact with one or more species of algae. The algae can then consume and deplete the nutrients in the feed water and naturally form characteristic plant lipids.

Algal growth zone 1 can include a controlled water velocity field. For instance, algal growth zone 1 can be placed in communication with a flow rate control device, as is known in the art. A flow rate control device can be, for example and without limitation, a low speed, low head, paddlewheel that can include feedback control. Feedback control can be provided according to known systems, for instance with a microprocessor or other control system. Flow rate control can provide enhanced gas exchange in certain embodiments.

Algal growth zone 1 can be in fluid communication with an invertebrate animal culture area, as at 2. For instance, a connector, such as a culvert, piping, or the like, can connect algal growth zone 1 with invertebrate animal culture area 2. Fluid flow between the algal growth zone 1 and the animal culture area 2 can likewise be controlled with a flow rate control system, which can be the same or different as the system utilized to control flow within algal growth zone 1. Optionally, an invertebrate animal culture area can be developed within algal growth zone, though this may lead to certain process limitations, for instance due to the necessity of both growth systems existing under identical conditions.

Invertebrate animal cultures encompassed by the present disclosure can in general include any invertebrate system capable of uptake and conversion of the plant lipids of the algal feedstock. In one embodiment, invertebrates having a naturally high lipid content and a rudimentary nervous system are preferred due to both ethical and practical considerations. Moreover, aquatic invertebrates can be preferred due to ease of culturing with an algal biomass feedstock as well as ease of harvesting.

Preferred invertebrates as may be developed in animal culture area 2 for any particular system can depend upon culture conditions. For instance, preferred invertebrate systems can be selected based upon geographic location, light availability, temperature conditions, culture water characteristics (e.g., salt water or fresh water), and the like. Moreover, the disclosed processes can be utilized with natural animal systems or transgenic invertebrates. Exemplary invertebrates encompassed by the disclosed methods can include bivalves, such as clams and mussels, or crustaceans, such as shrimp, cocapods, and so forth.

In one particular embodiment, an aquatic animal culture including brine shrimp can be utilized for uptake and conversion of the plant lipids of the algal feedstock. Brine shrimp are crustaceans of the genus *Artemia*. Strains of brine shrimp have been found all over the world. Cyst of brine shrimp are metabolically inactive and can remain in total stasis for long periods of time, up to several years while in dry, oxygen-free conditions, even at temperatures below freezing. Brine shrimp are commonly utilized in research and also as aquarium food as they are naturally high in lipids and unsaturated fatty acids, with lipid levels being naturally highest in newly hatched brine shrimp.

Beneficially, a brine shrimp culture can be developed on any suitable algal biomass to provide a relatively consistent lipid content animal culture. For instance, a brine shrimp culture can be developed on either a high oil content feedstock or a low oil content feedstock, with the product animal culture having essentially the same weight percentage of animal lipid in either case. For example, an adult brine shrimp culture can have a lipid content of up to about 20 wt. %, in one embodiment, or even higher in another embodiment, for instance up to about 30 wt. %, or between about 20 wt. % and about 25 wt. % in another embodiment.

In one embodiment, the algal feedstock can include green algae of the species *Dunaliella*, which are very small single celled organisms and have a soft exterior for easy consumption by brine shrimp in general and by juvenile brine shrimp in particular. Diatoms can also be utilized as feedstock for a brine shrimp culture, optionally in combination with other species of algae.

It can be preferred in one embodiment to encourage growth and development of a high density invertebrate animal culture, so as to improve efficiency of the process. Accordingly, culturing conditions can be controlled so as to encourage a high density animal culture. Such high density culture conditions can vary according to the specific species to be cultured. For instance, in one preferred embodiment, an algal feedstock can be utilized to support a brine shrimp culture and culturing conditions can be controlled so as to develop and maintain a high density brine shrimp culture.

Difficulties have been encountered in the past in attempts to develop a high density brine shrimp culture. These difficulties have been overcome in the present disclosure due to the recognition that a brine shrimp culture can thrive in an alkaline environment.

Under normal metabolism, brine shrimp will expel both carbon dioxide and ammonia. At high density, the output of an animal culture can cause the pH of the culture to decrease, due primarily to the level of carbon dioxide output, leading to decrease in population of the culture, up to and including death of the entire culture. It has been discovered that control of pH can circumvent this outcome and can encourage the on-going survival of a high density brine shrimp culture.

Accordingly, one embodiment of the disclosed subject matter is directed to development of a high density brine shrimp culture through development and maintenance of an alkaline culture environment. For example, for optimum performance a brine shrimp culture can be maintained within a pH range between about 8 and about 10.

The high pH of the culture can be maintained by addition of any suitable alkaline compound such as sodium hydroxide, potassium hydroxide, calcium hydroxide, and so forth; combinations thereof can also be added to a brine shrimp culture. An alkaline compound can be added to a culture either periodically on continuously, as required, so as to maintain the culture at a pH greater than about 8. For instance, an alkaline solution metering pump can be utilized to deliver a suitable amount of a base to the culture system and maintain the culture at a pH between about 8 and about 10.

Through maintenance of an alkaline culture environment, a rapidly growing, healthy, high density brine shrimp culture can be maintained. For instance, a high density brine shrimp culture operating at a density range equivalent to between about 1000 and about 10,000 adult animals per liter can be maintained provided a technique is included to maintain physical containment of the animals while allowing for rapid addition and flow-through of algal suspension with simultaneous rapid removal of fecal waste particles as described herein. For example, culture density can be greater than about 2,000 adult animals per liter or greater yet in other embodiments, for instance, greater than about 5,000 adult animals per liter.

Figure 2:
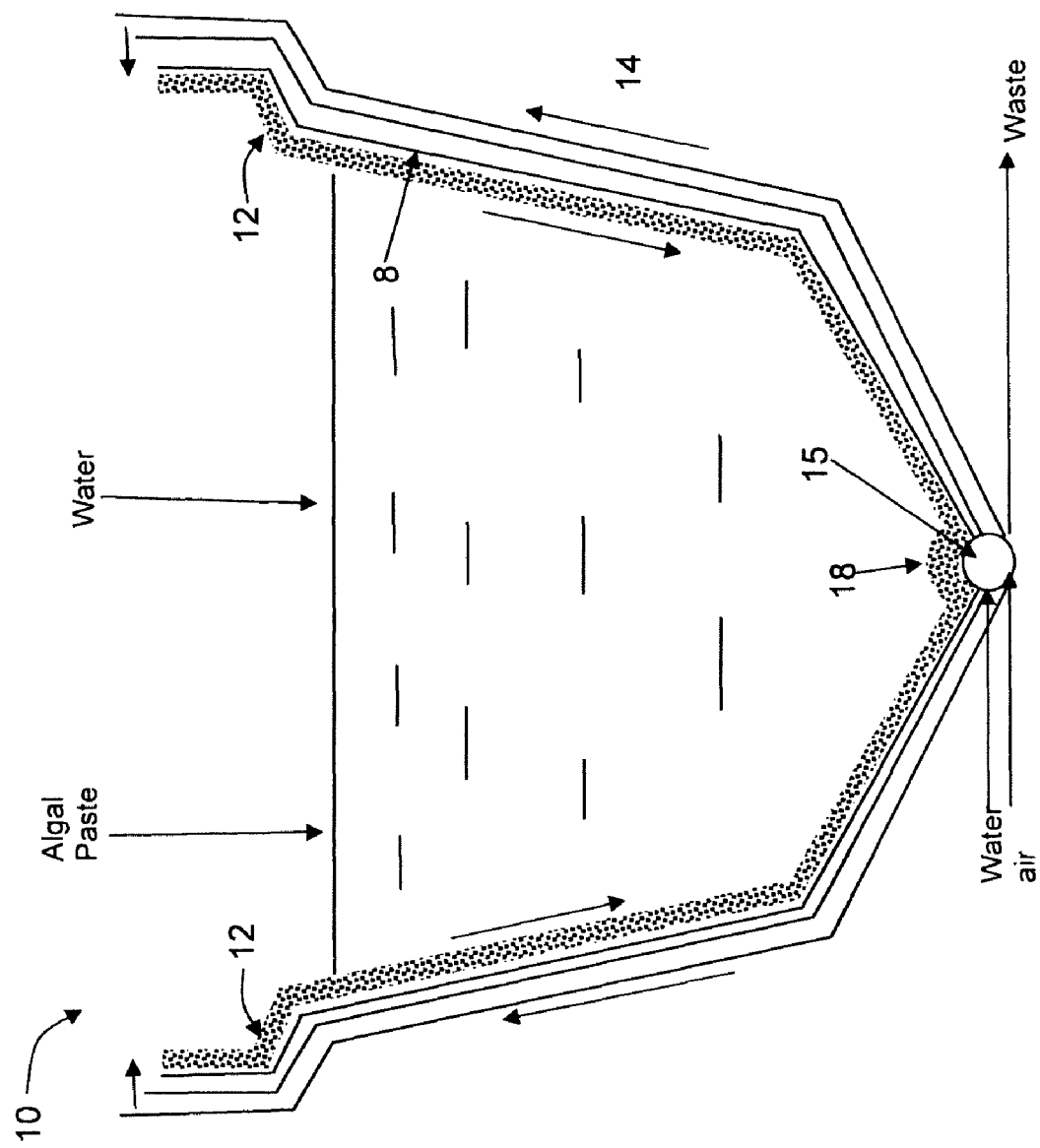
FIG. 2 schematically illustrates one embodiment of a culture vessel as may be used in a process as described herein.

Referring again to FIG. 1, any suitable animal culture system may be utilized in development and maintenance of the algae-fed animal culture area 2. For example, one embodiment of a suitable aquatic culture system and device is illustrated in FIG. 2 and further described in U.S. Pat. No. 4,368,691 to Brune, which is incorporated herein by reference. It should be understood that this is an exemplary embodiment only, and disclosed culture systems are not limited to this illustrated embodiment. According to this illustrated embodiment, an aquatic culture vessel 10 can include a flowing mass of loose particles 12 along a boundary 28 of a region in which aquatic organisms are cultured with the particles then being directed out of the region and preferably being cleaned and recirculated 14 through the flow. The particle flow may be used to establish a submerged moving bed 18 at the bottom of the organism containment region and/or may be used to clean one or more walls 28 within the culture vessel 10. The flowing particles and materials accumulated with the particles can flow out of the containment region through a submerged outlet 15, while the developing organisms can be held in the vessel by the particle bed 18 that can fill the outlet. Such a culture system can be preferred in some embodiments as screens are not necessarily required to confine the organisms and clogging problems are avoided. In addition, a high rate of liquid flow through the culture region may readily be established and maintained.

Other culture systems as are known in the art may be utilized. For instance, in one embodiment a cross-flow screen system in conjunction with a vessel, an earthen or concrete channel, or any other suitable animal culture containment area may be utilized to provide a self-cleaning system that can remove waste materials while maintaining the animal culture in tact. Cross-flow screen systems are generally known in the art and include systems such as those described in U.S. Pat. No. 4,250,038 to Dryden, which is incorporated herein by reference. Waste materials can be removed from the culture system in one embodiment through utilization of a porous base in the culture system. For instance, a porous conveyor can extend below the culture area 2. In another embodiment, flocculating agents can be utilized, so as to promote settling of waste in the system. For instance, a metal salt such as an iron salt may be used to enhance flocculation. By way of example, iron chloride or iron sulfate may be utilized as a flocculating agent in removing waste from an animal culture.

The invertebrate animal culture can be allowed to develop on the algal feedstock for a period of time to allow uptake and convert the algal lipids, carbohydrates, and/or proteins of the feedstock into animal lipid. The preferred amount of time allowed for the culture to develop can depend upon the system characteristics such as, for instance, culture temperature. For instance at a culture temperature of between about 25° C. and about 32° C., average brine shrimp age at harvest can be between about 10 days and about 14 days.

Referring again to FIG. 1, following growth and development on the algal biomass feedstock, the animal culture can be harvested for oil extraction as at a combined grinder/oil extraction unit 3.

According to one embodiment, the animal lipid content of the harvested biomass can be separated from the bulk biomass by simply grinding the wet tissue in a suspension of organic solvents, as at a combined grinder/oil extraction unit 3 in FIG. 1. In another embodiment, however, a grinder can be utilized prior to and at a different location from that where the freed lipid is extracted from the ground proteinaceous sludge formed upon grinding the harvested animal biomass. Beneficially, the biomass can be directly ground without the use of heat, i.e., the biomass can be ground at ambient temperature, further decreasing costs of the process and limiting environmental concerns in those embodiments in which an organic extractant is utilized in the process.

Any suitable grinder and grinding process can be utilized. For instance a composition including the harvested biomass in water can be delivered to a high speed grinding process that can simultaneously grind and pasteurize the biomass. Grinding of the biomass can disrupt physiological structures of the biomass, e.g., tissue and cellular structures, and release free lipid from surrounding tissue and structural components. A wet grind is not required, however. Alternatively, a majority of the water can be removed from the harvested biomass prior to grinding, leaving the harvested biomass to be processed with little free water in the composition. In yet another embodiment, the harvested biomass can be dried, and a dry grinding process can be utilized.

Beneficially, and whether utilizing a wet, moist, or dry grind, the grinding process can be relatively quick, for example, a grind of less than about 5 minutes can free a large proportion (e.g., greater than about 25% by weight) of the lipids from the biomass. A single grind can be carried out for a shorter time period in other embodiments, for instance less than about 3 minutes, or less than about 2 minutes, and a large proportion of the lipid (e.g., greater than about 10% by weight of the total lipid content) can be freed from the biomass.

Simultaneous with or following the grinding process, freed lipid can be extracted from other components of the biomass. For instance, following removal of the harvested biomass from the culture vessel, the wet biomass can be combined with an extraction solvent in an oil extraction unit that can be, for example, a tank or any other suitable vessel. Extraction solvents can include, without limitation, organic solvents such as hexane, benzene, isopropanol, and the like, optionally in combination with one another as is generally known in the art. The mixture can then be ground in a wet grind process, for instance using a high speed homogenizer. A grind process can be quite short, for instance less than about 5 minutes in duration. Following extraction, remaining solids can be separated from the organic phase, for instance via centrifugation, screening, or the like, and the separated solids can be ground again. Repetition can be carried out one or more times, providing increased lipid recovery. For instance, three consecutive grinds of a harvested biomass can provide recovery of more than about 70 wt. % of the lipid content of the biomass, greater than about 80 wt. %, or greater than about 90 wt. %, in another embodiment.

Referring again to FIG. 1, following a grinding/extraction process, the organic phase can be separated from the solids, e.g., a primarily proteinaceous aqueous sludge, at a separation process 4. Any suitable separation process can be utilized including sedimentation, centrifugation, flocculation facilitated with any suitable flocculent such as metal salts and/or organic polymers, and the like.

Recovered oils can be processed and utilized according to any known process and system and for any of a variety of applications. For instance, the oil stream obtained at separation of the biomass product can be utilized to form biodiesel according to a transesterification process. In general, a transesterification process can include a catalyzed reaction between the triglycerides of the feed oil and an alcohol (e.g., methanol) to form lower alkyl esters (i.e., biodiesel) and glycerol. For example, the Connemann process (U.S. Pat. No. 5,354,878, incorporated herein by reference), which is well known to those of ordinary skill in the art, can be utilized to form biodiesel and glycerol from the separated oils.

In general, the Connemann process utilizes continuous flow of the reaction mixture (triglyceride-containing oil, alcohol, and alkaline catalyst) through reactor columns, in which the flow rate is lower than the sinking rate of glycerol. This results in the continuous separation of glycerol from the biodiesel. The reaction mixture may be processed through further reactor columns to complete the transesterification process. Residual methanol, glycerol, free fatty acids and catalyst may be removed by aqueous extraction.

Biodiesel production from animal lipid obtained as disclosed herein is not limited to formation via the Connemann process, however. For instance batch reaction methods (e.g., J. Am. Oil Soc. 61:343, 1984) may be preferred in other embodiments. Any method known in the art for producing biodiesel from triglyceride-containing oils may be utilized; for example methods as disclosed in U.S. Pat. No. 4,695,411 to Stern, et al.; U.S. Pat. No. 5,338,471 to Lal; U.S. Pat. No. 5,730,029 to Stoldt, et al.; U.S. Pat. No. 6,015,440 to Noureddini; U.S. Pat. No. 6,174,501 to Noureddini; U.S. Pat. No. 6,538,146 to Turck; U.S. Pat. No. 6,884,900 to Maeda, et al.; U.S. Pat. No. 6,960,672 to Nakavama, et al., and U.S. Patent Application Publication 2004/0074760 to Portnoff, et al., each of which are incorporated herein by reference. Alternative methods for formation of biodiesel from triglycerides that do not involve transesterification may also be used. For example, by pyrolysis, gasification, or thermochemical liquefaction methods can be used (see, e.g., Dote, 1994, Fuel 73:12; Ginzburg, 1993, Renewable Energy 3:249-52; Benemann and Oswald, 1996, DOE/PC/93204-T5).

The crude biodiesel can be further processed as desired, for instance to provide a biodiesel product having characteristics particular to a specific application. For instance, U.S. Patent Application Publication 2006/0074256 to Alasti, incorporated herein by reference, describes a process including separating salts, alcohols, and glycerol from a feed stream including all of the above in combination with mono-alkyl ester biodiesel to provide a high-grade biodiesel product. U.S. Pat. No. 6,827,841 to Kiser, et al., incorporated herein by reference, describes a low viscosity, high coking value petroleum tar material that contains at least one biodiesel dissolved therein.

Applications for animal lipids obtained as described herein are not limited to formation of biodiesel. The concentrated oils obtained following separation of the grind products can be used in any of a number of commercial applications. For instance, the separated oils can be utilized as a high calorie food additive or supplement, for instance in infant formulas, parenteral nutrition, in the form of capsules as a nutrition supplement, and the like. Other uses can include use as an active ingredient in cosmetic products, as emulsifiers in the food or cosmetics industries, or as lubricants. In one embodiment, the animal lipids can be further separated, for instance in an oil fractionation process 5 as shown in the flow diagram of FIG. 1, to provide a first oil stream as may be utilized in production of a first product, e.g., biodiesel, and a second oil stream that may provide a second product, e.g., high value oils as may be utilized in formation of cosmetics, animal or human food supplements, lubricants, and so forth.

Moreover, useful products that can be obtained from disclosed processes are not limited to the extracted animal lipids, as byproducts of the process can also provide value. For instance, referring again to the embodiment illustrated in FIG. 1, an aqueous phase formed at a separation process 4 can provide a variety of useful by-products including animal feeds, agriculture fertilizers, and methane. For example, the proteinaceous sludge separated in the aqueous phase can be concentrated to provide a high-value protein for use in animal feed and as a replacement for declining oceanic fishmeal resources, and the carotenoid pigments of the sludge can be separated for use as antioxidants, coloration, and the like. Other useful byproducts of the process can include the waste materials obtained from the animal culture, which can provide high value compounds as may be utilized in animal feeds, fertilizers, and the like. In the illustrated embodiment, at least a portion of separated sludge materials can be digested in a digestion process 6 according to standard wastewater treatment processes including, e.g., aerobic digestion, anaerobic digestion, flocculation, etc.

Figure 3:
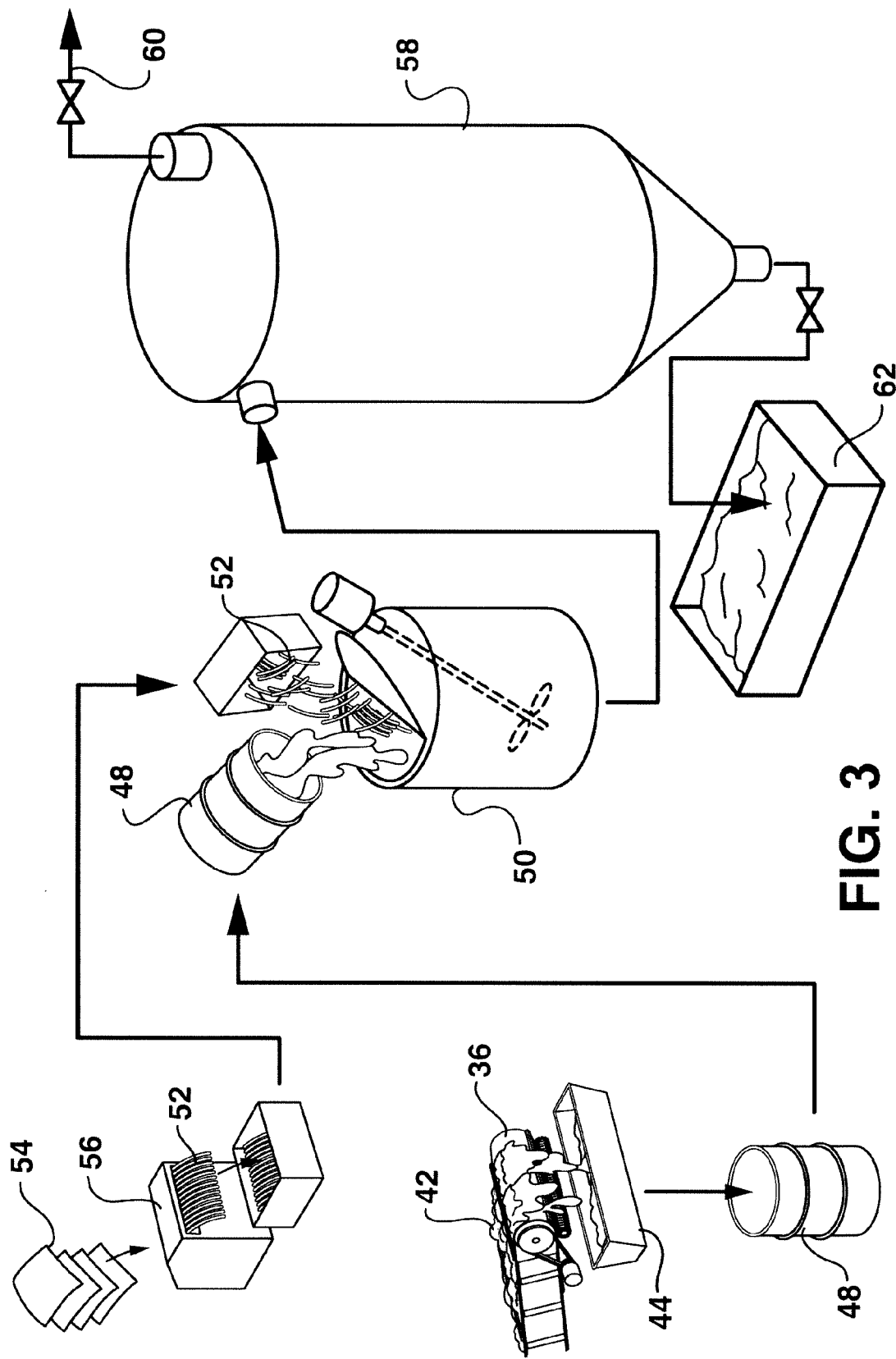
FIG. 3 illustrates one embodiment of a byproduct processing system as described herein.
Figure 4A:
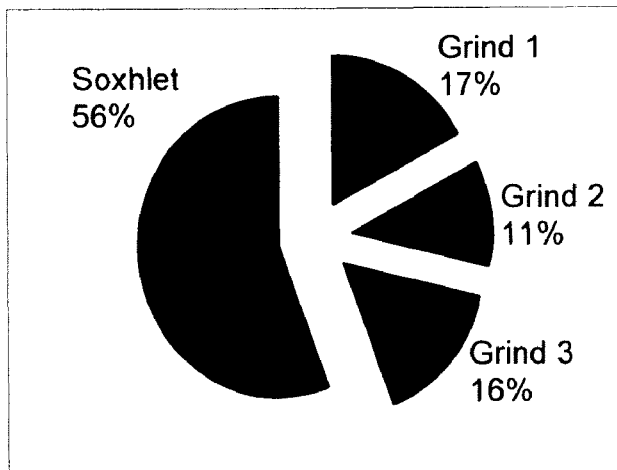
FIG. 4A discloses the lipid extracted in each of several consecutive in-solvent, wet-grindings as described herein followed by a Soxhlet extraction for S. platensis algae in hexane.
Figure 4B:
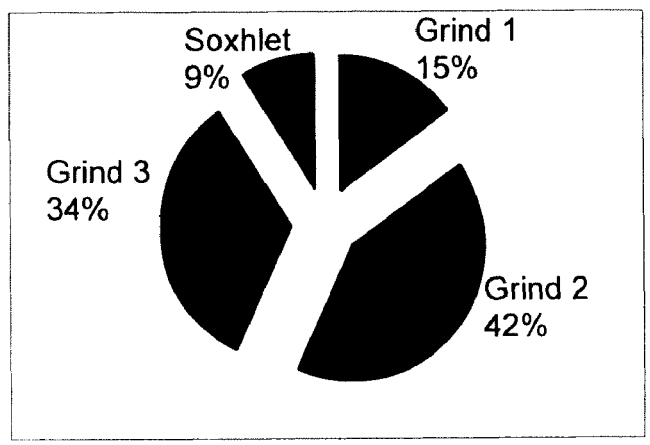
FIG. 4B discloses the lipid extracted in each of several consecutive in-solvent, wet grindings as described herein followed by a Soxhlet extraction for a commercial 100% Artemia biomass in hexane.
Figure 4C:
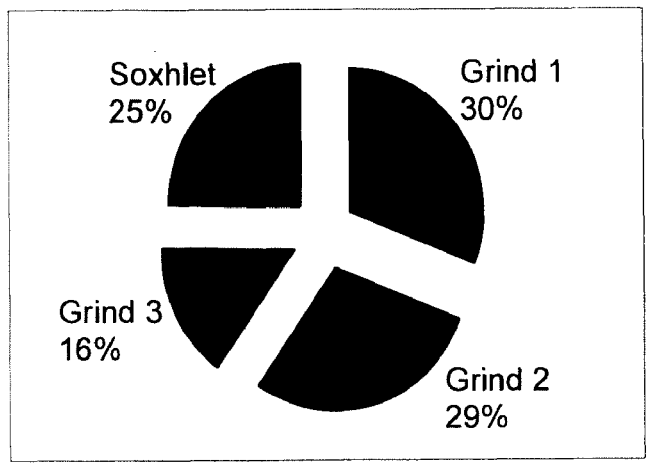
FIG. 4C discloses the lipid extracted in each of several consecutive in-solvent, wet grindings as described herein followed by a Soxhlet extraction for adult brine shrimp in hexane.
Figure 4D:
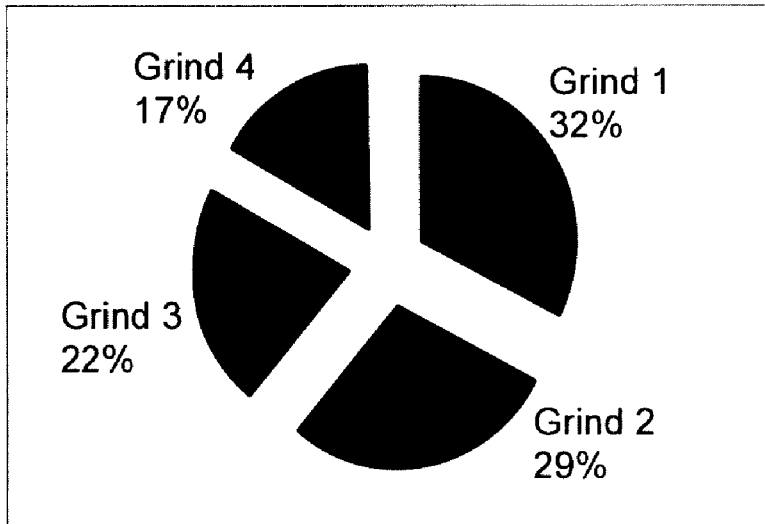
FIG. 4D discloses the lipid extracted in each of several consecutive in-solvent, wet grindings as described herein followed by a Soxhlet extraction for adult brine shrimp in a 3:2 hexane:isopropanol mixture following discard of the liquid.
Figure 4E:
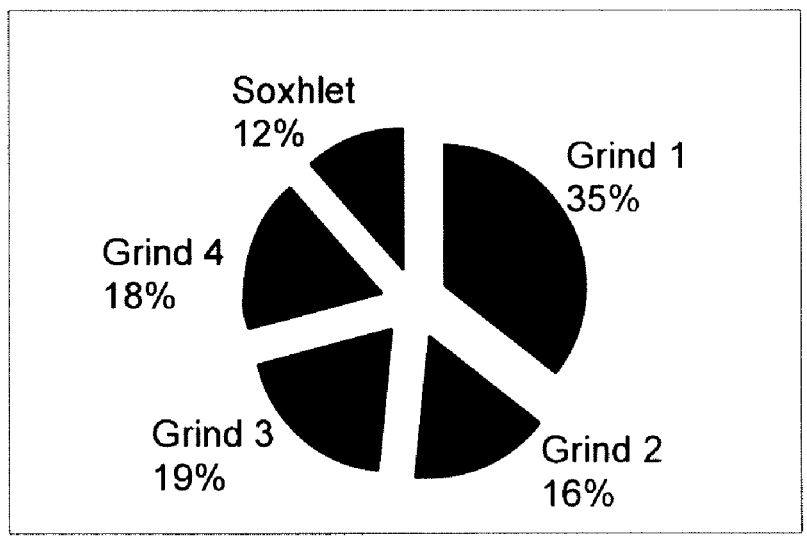
FIG. 4E discloses the lipid extracted in each of several consecutive in-solvent, wet grindings as described herein followed by a Soxhlet extraction for adult brine shrimp in a 3:2 hexane:isopropanol mixture.

For example, referring to FIG. 3, one embodiment of a process and system for converting solids separated from the harvested biomass into a hydrocarbon fuel is illustrated. As shown, following separation from the recovered lipids, the proteinaceous-rich sludge 42 can be collected at 44 and transferred to another suitable container such as a barrel 48 and placed in a mixer 50. In one embodiment, the proteinaceous sludge can be combined in the mixer 50 with a cellulose source 52 according to methods disclosed in U.S. Pat. No. 7,258,790 to Brune, et al., previously incorporated by reference. Various cellulose sources may be used; in the depicted embodiment, the cellulose source is shredded waste paper. For example, as shown, a waste paper 54, such as newspaper, is fed to a shredder 56 and shredded. The shredded paper 52 is then fed to the mixer 50. In one particular embodiment, the paper may be combined with the sludge 42 in an amount from about 20% to about 80% by weight, such as from about 40% to about 60% by weight.

The cellulose/sludge mixture can then be placed in a digester 58 where it ferments to produce a hydrocarbon gas 60, such as methane, and a nitrogen-rich residue 62. The digester mixture may be heated to a temperature of at least about 30° C., such as from about 30° C. to about 40° C. in a water bath, for instance, to aid in the conversion process. A cellulose substrate can create a high carbon/nitrogen ratio, which can increase gas yield by reducing the high concentration of ammonia in the digester. Although unknown, it is believed that the presence of the paper causes the production of cellulose enzymes which then facilitate the breakdown of the sludge.

The nitrogen-rich residue 62 that is removed from the digester 58 contains concentrated amounts of nitrogen and phosphorus. For instance, the nitrogen present in the residue may be greater than 70%, such as greater than 95%, and may be in the form of ammonia. At least 30% of the phosphorus contained in the residue, particularly at least 50% of the phosphorus contained in the residue may be contained in a soluble compound. Thus, the residue 62 represents a valuable byproduct, e.g., a fertilizer, which may be packaged and used in agricultural applications. Optionally, some or all of the materials produced in the digestion process 6 can be recycled in a recycle stream 8 back to the algal growth zone 1.

The hydrocarbon produced, for instance methane, can be further utilized, for instance as feed gas to a cogeneration power plant, as illustrated in FIG. 1. Moreover, and as discussed above, carbon dioxide produced in a power generation process, as at 7 can be recycled back to the algal growth zone 1.

The disclosed subject matter may be better understood with reference to the Example, below.

Example

A food grade organic algae (*Spirulina platensis*), a commercial 100% Artemia biomass prawn and shrimp diet (Black Pearl® Flake), and commercially available frozen adult brine shrimp were ground in either 100% hexane or a 3:2 hexane:isopropanol extraction solvent at room temperature. In each procedure, a first grind was carried out, followed by a low speed centrifugation (3000 rpm). This was followed by two or more additional grinds and extractions of the residual brine shrimp solids. Grinding of the materials was carried out with a Kinematica® Polytron homogenizer. Details of each procedure are described in Table 1, below. Columns headed 1, 2, 3, 4, and Soxhlet provide the total amount of lipid extracted in each grind (each of which was 1 minute) and a final Soxhlet extraction process. The column headed % lipid provides the weight percent of the total amount of lipid extracted with reference to the total sample weight.

TABLE 1

| No. | Biomass | Protein content | Extraction solvent | 1 (g) | 2 (g) | 3 (g) | 4 (g) | Soxhlet (g) | % lipid |
|---|---|---|---|---|---|---|---|---|---|
| 1 | *S. platensis* | 60-69% | Hexane | 0.121 | 0.077 | 0.108 | | 0.388 (6 hr) | 28 |
| 2 | Black Pearl ® | 48% min. | Hexane | 0.069 | 0.185 | 0.153 | | 0.041 (6 hr) | 20 |
| 3 | Brine shrimp | 4.5% min. | Hexane | 0.096 | 0.090 | 0.049 | | 0.312 (6 hr) | 25 |
| 4 | Brine shrimp | 4.5% min. | Hexane:isopropanol (3:2) | 0.463 | 0.406 | 0.311 | 0.242 | | 56 |
| 5 | Brine shrimp | 4.5% min. | Hexane:isopropanol (3:2) | 0.457 | 0.200 | 0.251 | 0.225 | 0.149 (4 hr) | 67.3 |

Procedure Nos. 1 and 2 were carried out with the materials as received. Procedure No. 3 was carried out following drying of the brine shrimp in an oven at 105° C. for 24 hours. Procedure No. 4 was carried out with a wet sample following centrifugation and discard of the liquid solution. Procedure No. 5 was carried out with a wet sample in liquid solution.

Figure 5A:
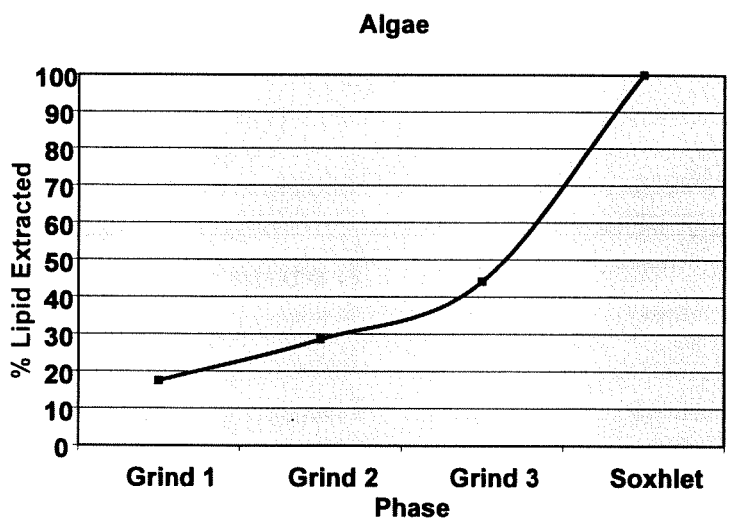
FIG. 5A discloses the percentage of total lipid extracted with each of three consecutive in-solvent wet-grindings followed by a Soxhlet extraction for S. platensis algae in hexane.
Figure 5B:
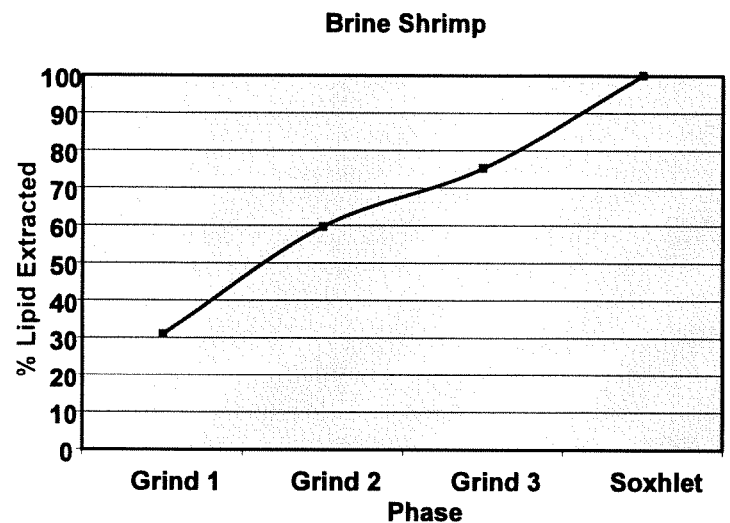
FIG. 5B discloses the percentage of total lipid extracted with each of three consecutive in-solvent wet-grindings followed by a Soxhlet extraction for adult brine shrimp in hexane.
Figure 5C:
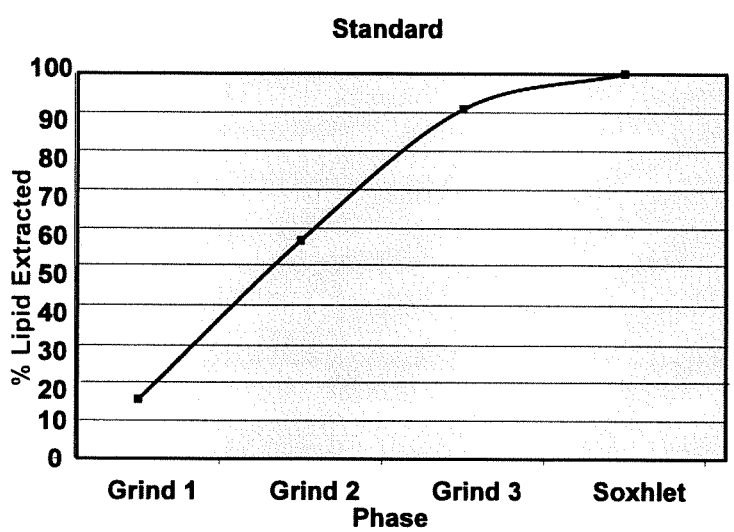
FIG. 5C discloses the percentage of total lipid extracted with each of three consecutive in-solvent wet-grindings followed by a Soxhlet extraction for a commercial 100% Artemia biomass in hexane.
Figure 6:
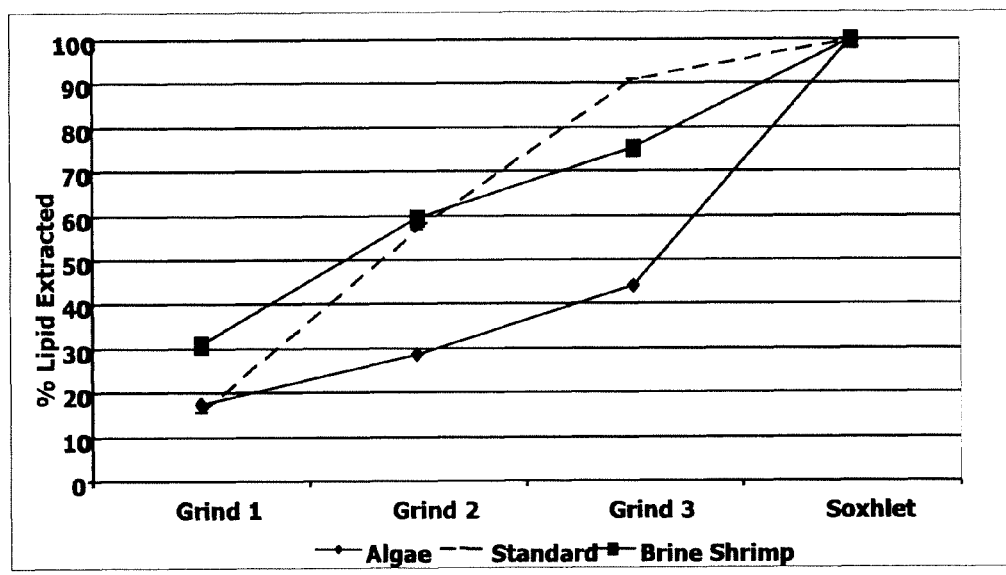
FIG. 6 is an overlay of FIGS. 5A-5C.

FIGS. 4A-4E graphically illustrate the proportion of lipid extracted from each grind in each of Procedures 1-5, respectively. FIGS. 5A-5C graphically illustrate the total amount of lipid extracted following each grind in each of Procedures 1-3, respectively, and FIG. 6 overlays these separate results for easier comparison.

As can be seen, 50-75% of the brine shrimp oil was extracted with 4-one minute, room temperature, sequential grinds of the wet biomass.

It will be appreciated that the foregoing examples, given for purposes of illustration, are not to be construed as limiting the scope of this disclosure. Although only a few exemplary embodiments have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure which is herein defined and all equivalents thereto. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. A method for recovering lipids from a renewable natural resource comprising:
    growing an algal feedstock biomass in an algal growth zone;
    flowing the algal feedstock biomass from the algal growth zone to a brine shrimp culture;

developing the brine shrimp culture on the algal feedstock biomass, wherein the brine shrimp culture is maintained at a pH between 8 and about 10 during the development of the brine shrimp culture;

harvesting the brine shrimp culture, wherein the brine shrimp culture is maintained prior to harvest at a density range equivalent to greater than about 1,000 adult animals per liter; and extracting natural animal lipids from the brine shrimp culture.

2. The method according to claim 1, further comprising adding a stream containing nutrients to the algal feedstock biomass.

3. The method according to claim 2, wherein the stream is derived from wastewater.

4. The method according to claim 2, wherein the stream is derived from flue gas.

5. The method according to claim 1, wherein the algal feedstock is a high oil content algal feedstock.

6. The method according to claim 1, wherein the algal feedstock is a low oil content feedstock.

7. The method according to claim 1, wherein the algal feedstock comprises multiple algae species.

8. The method according to claim 1, wherein the brine shrimp culture is maintained prior to harvest at a density range equivalent to between about 1,000 and about 10,000 adult animals per liter.

9. The method according to claim 1, further comprising grinding the harvested brine shrimp-culture to form a proteinaceous sludge.

10. The method according to claim 9, wherein the harvested brine shrimp culture is wet-ground.

11. The method according to claim 10, wherein the harvested brine shrimp culture is wet-ground in a solution comprising an organic extraction solvent.

12. The method according to claim 9, wherein the harvested brine shrimp culture is dry-ground.

13. The method according to claim 9, wherein the harvested brine shrimp culture is ground for a period of time of less than about five minutes.

14. The method according to claim 9, wherein the harvested brine shrimp culture is ground at ambient temperature.

15. The method according to claim 9, further comprising extracting the natural animal lipids from the proteinaceous sludge.

16. The method according to claim 15, further comprising grinding the proteinaceous sludge and extracting natural animal lipids from the ground proteinaceous sludge.

17. The method according to claim 16, further comprising repeating the grinding process and the extraction process one or more times.

18. The method according to claim 15, further comprising digesting the proteinaceous sludge.

19. The method according to claim 18, further comprising collecting a hydrocarbon gas formed during the step of digesting the proteinaceous sludge.

20. The method according to claim 1, wherein the brine shrimp culture is developed on the algal feedstock biomass for a period of time of between about 10 days and about 14 days.

21. The method according to claim 20, wherein the brine shrimp culture is developed at a culture temperature of between about 25° C. and about 32° C.

* * * * *